United States Patent [19]

Jenkins

[11] 4,263,242

[45] Apr. 21, 1981

[54] FLEXIBLE ENDLESS PRINTING BAND AND METHOD OF PRODUCTION

[75] Inventor: William A. Jenkins, Englewood, Ohio

[73] Assignee: Monarch Marking Systems, Inc., Dayton, Ohio

[21] Appl. No.: 951,342

[22] Filed: Oct. 16, 1978

[51] Int. Cl.[3] .............................................. B29D 7/16

[52] U.S. Cl. .................................... 264/132; 101/111; 264/129; 264/139; 264/159

[58] Field of Search ............... 264/129, 132, 139, 159; 101/111

[56] References Cited

U.S. PATENT DOCUMENTS

| | | | |
|---|---|---|---|
| 1,448,286 | 3/1923 | Comstock | 264/139 |
| 3,418,929 | 12/1968 | Nelson | 101/111 |
| 3,862,698 | 1/1975 | Hafele | 264/159 |
| 3,977,321 | 8/1976 | Pabodie | 101/111 |

*Primary Examiner*—James H. Derrington
*Attorney, Agent, or Firm*—Jacox & Meckstroth

[57] ABSTRACT

A wide endless flexible band (10) is molded on a flat core blade (12) with one group of laterally extending rows of outwardly projecting printing characters (16) molded on one side of the core blade between a set of laterally extending notched guide bars (32). The notches within the guide bars are used to align the wide endless band on a rotary cylindrical arbor (40) precisely with a set of spaced cutters (44) which slit the wide band at laterally spaced intervals into a plurality of relatively narrow endless printing bands. The wide endless band is also molded with a second group of raised characters (14) which correspond to the printing characters and are positioned on the other side of the core blade between a set of laterally extending continuous guide bars (24). The continuous guide bars have outer surfaces which are flush with the outer surfaces of the raised characters and provide for precisely guiding a member (28) which removes a coating of color contrasting material from the outer surfaces of the characters to make them visually readable.

8 Claims, 5 Drawing Figures

FLEXIBLE ENDLESS PRINTING BAND AND METHOD OF PRODUCTION

BACKGROUND OF THE INVENTION

In the manufacture or production of endless printing bands, for example, of the type disclosed in U.S. Pat. No. 3,977,321 which issued to the Assignee of the present invention, it is common to mold a wide endless band with laterally extending rows of raised characters, for example, by using a compression mold and a flat core blade as disclosed in U.S. Pat. No. 3,418,929. The mold provides the wide endless band with raised printing characters on one side of the core blade and with corresponding raised visually readable characters on the opposite side of the core blade. The visually readable characters are formed by applying a coating of color contrasting or white paint-like material to the corresponding side of the wide endless band, and then the coating is wiped or removed from the outer surfaces of the raised characters so that each character is clearly readable on the light or white background formed by the coating.

The wide endless band is then cut or slit at laterally spaced intervals to form a plurality of narrower endless bands. Preferable, the wide endless band is reinforced by an internal reinforcing cord or filament which is wound on the flat core blade before the compression molding operation, for example, as shown in above Pat. No. 3,418,929.

In the process of wiping the color contrasting or white material from the outer surfaces of the molded characters to form the visually readable characters, it is difficult to assure that the coating is removed only from the outer surfaces of the raised characters and not from the adjacent background or relief areas. This problem is particularly serious when the band is only partially filled with raised characters on each side of the core blade and a portion of the wide endless band has no molded raised characters If the coating is inadvertently removed from the background area, the band usually becomes scrap material.

There is also a problem encountered when cutting wide endless band into a plurality of relatively narrower endless bands after the visually readable characters are formed. That is, the wide endless band is usually slit by a row of cutting saws or knives after the wide endless band is mounted or pulled onto a rotatable cylindrical arbor. Thus it is important that the wide endless band be precisely located on the arbor relative to the row of adjacent alitting saws or knives. If the wide band is not precisely located on the arbor relative to the slitting knives, the peripherally spaced characters on each narrow band are not located uniformally relative to the opposite edges of the band, with the result that scrap bands are produced.

SUMMARY OF THE INVENTION

The present invention is directed to an improved method of producing flexible endless printing bands and to the resulting bands, and provides for solving the problems set forth above. Thus the invention minimizes the production of scrap bands which do not have distinct visually readable characters and/or are formed by inprecise cutting of the wide endless band at laterally spaced intervals. As a result, the present invention provides for producing narrow endless printing bands having edge surfaces which are precisely located relative to the peripherally spaced characters on the band and having clearly readable characters on the portion of the band opposite the corresponding printing characters.

In accordance with the preferred embodiment of the invention, a wide endless band is molded around a flat core blade, and laterally extending parallel spaced guide bars are molded as integral parts of the wide band on each side of the core blade. On one side of the core blade, the outer surfaces of the guide bars are flush with the outer surfaces of the molded raised characters so that after a coating of background or white material is applied to the corresponding side of the wide band, the parallel bars are used to guide an element which removes the coated layer from only the outer surfaces of the raised characters and thereby forms precise visually readable characters. The raised parallel spaced guide bars molded on the opposite side of the core blade are each provided with laterally spaced notches which are used to slit the wide endless band into narrower endless bands by providing for convenient and precise alignment of the wide endless band with a bank or row of laterally spaced cutters.

Other features and advantages of the invention will be apparent from the following description, the accompanying drawing and the appended claims. dr

DESCRIPTION OF THE PREFERRED EMBODIMENT

Figure 1:
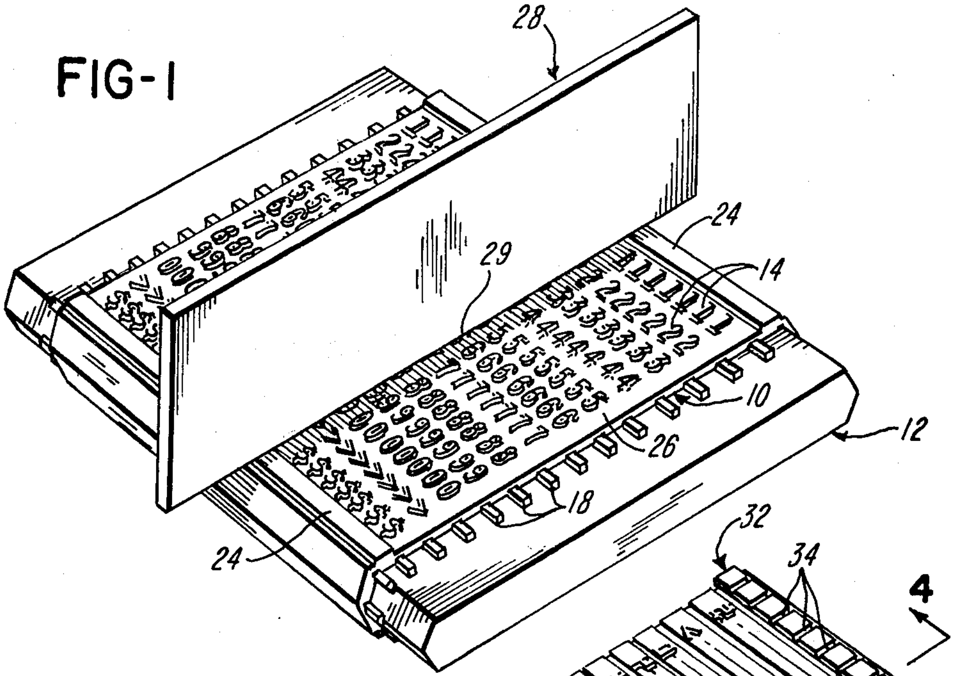
FIG. 1 is a perspective view of a wide endless band molded in accordance with the invention and illustrating the forming of the human or visually readable characters on the band.
Figure 2:
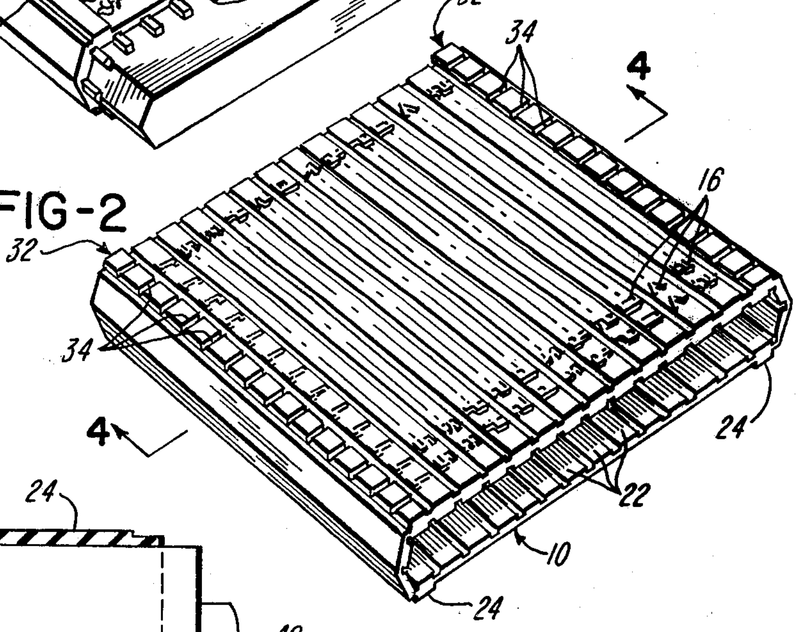
FIG. 2 is a perspective view of the wide endless band shown in FIG. 1 and illustrating the portion of the band having the printing characters.
Figure 3:
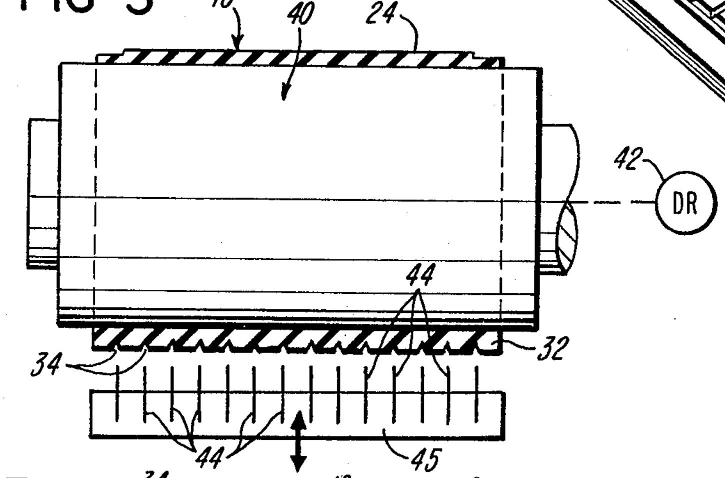
FIG. 3 is a somewhat diagramatic illustration of the operation for slitting the wide endless band shown in FIGS. 1 and 2 into a plurality of narrower endless printing bands.
Figure 4:
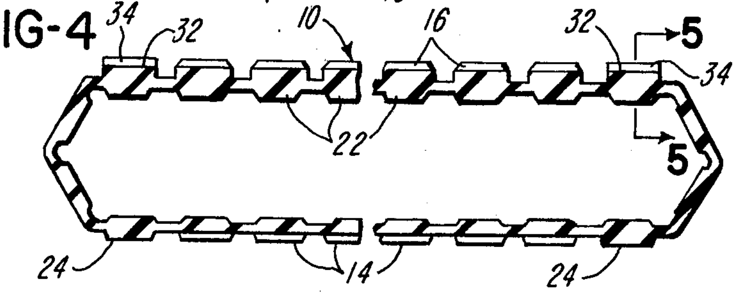
FIG. 4 is a section of the wide endless band taken generally on the line 4—4 of FIG. 2.

Referring to FIGS. 1 and 2, a wide endless band 10 is molded of a flexible rubber-like material and on a flat core blade 12 which is adapted to be positioned within the mold cavity. The mold is provided with a planar array of character recesses which oppose each side of the core blade 12 and form within the band laterally extending rows of raised characters 14 (FIG. 1) on one side of the core blade 12 and corresponding rows of raised printing characters 16 (FIG. 2) on the opposite side of the core blade. The opposite sides and the opposite ends of the core blade 12 are also provided with peripherally spaced and outwardly projecting ribs 18 which provide the wide endless band 10 with a series of peripherally spaced and inwardly projecting parallel drive teeth 22 (FIGS. 2 & 4). The band is also molded with an internal reinforcing filament which is wound on the core blade before the blade is inserted into the mold.

As shown in FIG. 1, the wide endless flexible band 10 is also molded with a set of peripherally spaced parallel integral guide bars 24 which extend laterally across the band 10 along opposite ends of one side of the core blade 12. The guide bars 24 have outer surfaces which are coplanar or flush with the outer surfaces of the raised characters 14, and the characters 14 are spaced between the laterally extending guide bars 24. While the two guide bars 24 shown in FIG. 1 are located at opposite ends of the core blade 12, it is to be understood that one or both of the guide bars 24 may be located inwardly from the ends of the core blade 12 and adjacent or intermediate the laterally extending end rows of characters 14. The inward spacing of one guide bar is particularly desirable when only a portion is molded with raised characters.

After the wide endless band 10 is removed from the mold with the core blade 12, the flat side of the band having the raised characters 14 is sprayed with a coating 26 of color contrasting material which bonds to the band 10 such as a coating of white vinyl. Before the coating dries, the coating is wiped from the outer surfaces of the raised characters 14 and the flat outer surfaces of the guide bars 24 by means of a wiping element or member 28 such as, for example, a straight rigid bar of dense sponge material. The wiping member 28 has a straight bottom edge 29 which engages the top surfaces of the guide bars 24 as well as the top surfaces of the raised characters 14. By removing the coating from the top surfaces of the raised characters 14, the characters are clearly defined and may be easily read since the top surfaces of the characters are dark and the surrounding relief areas are of a light or white color. The coating may also be removed from the outer surfaces of the characters after the coating is dry by using the bars 24 as guides for a shaving or grinding member.

Figure 5:
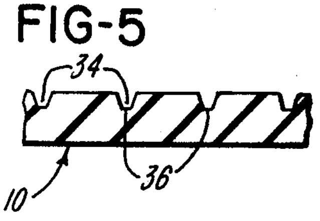
FIG. 5 is an enlarged fragmentary section taken generally on the line 5—5 of FIG. 4.

Referring to FIG. 2, the portion of the wide endless band 10 having the laterally extending rows of raised printing characters 16 is also molded with a pair of laterally extending guide bars 32 which are located adjacent opposite ends of the core blade 12 and with the laterally extending rows of printing characters 16 spaced between the guide bars 32. Each of the guide bars 32 is interrupted at laterally spaced intervals by a series of generally V-shaped notches 34, and each notch 34 has a flat bottom surface 36 (FIG. 5) having predetermined width, for example, 0.012 inch. The spacing between the notches 34 corresponds with the width of the narrow endless printing bands which are formed from the wide endless band 10, and the notches 34 provide guides for cutting the band 10 into a plurality of narrow endless bands.

After the wide endless band 10 is removed from the flat core blade 12, the band 10 is mounted or pulled onto a cylindrical mandrel or arbor 40 which is supported for rotation and connected to be rotated by an electric motor 42. The circumference of the arbor 40 is substantially the same as the inner circumference of the surrounding band 10 so that the band fits snugly on the arbor 40. As the band 10 is being mounted on the arbor 40, the notches 34 within one of the interrupted guide bars 32 are used to align the band 10 with a corresponding series of cutters or knives 44 which are supported by a knife holder 45 at laterally spaced intervals corresponding to the desired width of the narrow endless printing bands. The wide endless band 10 is shifted axially on the arbor 40 until the cutting edges of the knives 44 are aligned precisely within the flat bottoms 36 of the notches 34. The arbor 40 is then manually rotated approximately 180 degrees, and the notches 34 within the opposite guide bar 32 are aligned precisely with the cutting edges of the knives 44 by shifting a portion of the band 10 axially on the arbor 40. After the notches 34 within both of the guide bars 32 are precisely aligned with the cutting edges of the knives 44, the arbor 40 is rotated while the knife holder 45 is moved radially inwardly towards the arbor 40 so that the knives 44 cut or slit the wide endless band 10 into a plurality of narrow endless printing bands each having a width only slightly greater than the width of the molded raised characters 14 and 16.

From the drawing of the above description, it is apparent that the method of constructing or producing endless printing bands in accordance with the invention, provides desirable features and advantages. For example, the guide bars 24 provide for quickly producing clearly readable raised characters 14 by assuring that the coating of color contrasting material is removed from only the top outer surfaces of the characters 14. In addition, the interrupted guide bars 32 on the opposite side of the wide endless band 10 provide for conveniently and quickly mounting the endless band 10 on the rotary arbor 40 and in a precise relation to the cutting elements or knives 44. As a result, the guide bars 24 and 32 provide for significantly increasing the efficiency of producing endless printing bands and minimize the production of scrap endless bands caused by inaccurate wiping or removal of the coating from the portion of the band having the visually readable characters and/or by slitting the wide endless band at incorrect laterally spaced locations. The location of the guide bars 24 and 32 on opposite sides of the core blade 12 further provides for balancing the molding operation to assure uniform molding to the wide endless band.

While the method and article herein described constitute a preferred embodiment of the invention, it is to be understood that the invention is not limited to this precise method and article, and that changes may be made therein without departing from the scope and spirit of the invention as defined in the appended claims.

The invention having thus been described, the following is claimed:

1. In a method of producing endless flexible printing bands each having peripherally spaced printing characters and visually readable characters, and including the steps of molding a wide endless band with a series of peripherally spaced and laterally extending rows of outwardly projecting characters, providing a portion of the wide endless band with a color contrasting material for producing the visually readable characters, and cutting the wide endless band at laterally spaced intervals into a plurality of relatively narrower endless printing bands, the improvement comprising the steps of molding at least two generally parallel spaced guide bars as integral parts of the wide endless band, locating the guide bars with the visually readable characters disposed between the guide bars, and removing a portion of the color contrasting material from the visually readable characters by moving a member along the guide bars.

2. In a method of producing endless flexible printing bands each having peripherally spaced printing characters and visually readable characters, and including the steps of molding a wide endless band on a substantially flat core blade with a series of peripherally spaced and laterally extending rows of outwardly projecting characters, providing a portion of the wide endless band with a color contrasting material for producing the visually readable characters, and cutting the wide endless band at laterally spaced intervals into a plurality of relatively narrower endless printing bands, the improvement comprising the steps of molding at least two laterally extending and generally parallel spaced guide bars as integral parts of the wide endless band, locating the guide bars on one side of the core blade with a plurality of rows of characters disposed between the guide bars, and removing a portion of the color contrasting material from the visually readable characters by moving a member along the guide bars.

3. In a method of producing endless flexible printing bands each having peripherally spaced printing characters and visually readable characters, and including the steps of molding a wide endless band with a series of peripherally spaced and laterally extending rows of outwardly projecting characters, applying a coating of color contrasting material to a portion of the wide endless band to produce the visually readable characters, and cutting the wide endless band at laterally spaced intervals into a plurality of relatively narrower endless printing bands, the improvement comprising the steps of molding at least two laterally extending and generally parallel spaced guide bars as integral parts of the wide endless band, locating the guide bars with visually readable characters disposed between the guide bars and with the outer surfaces of the guide bars being flush with the outer surfaces of the characters, and removing the coating of color contrasting material from the outer surfaces of the characters by moving a member along the outer surfaces of the guide bars.

4. In a method of producing endless flexible printing bands each having peripherally spaced printing characters and visually readable characters and including the steps of molding a wide endless band on a substantially flat core blade with a series of peripherally spaced and laterally extending rows of outwardly projecting characters on each side of the blade, applying a coating of color contrasting material to a portion of the wide endless band on one side of the core blade to produce the visually readable characters, and cutting the wide endless band at laterally spaced intervals into a plurality of relatively narrower endless printing bands, the improvement comprising the steps of molding at least two laterally extending and generally parallel spaced guide bars as integral parts of the wide endless band, locating the guide bars on the one side of the core blade with the visually readable characters disposed between the guide bars and with the outer surfaces of the guide bars being flush with the outer surfaces of the characters, and removing the coating of color contrasting material from the outer surfaces of the characters by moving a member along the outer surfaces of the guide bars while the wide endless band remains on a substantially flat blade.

5. In a method of producing endless flexible printing bands each having peripherally spaced printing characters, and including the steps of molding a wide endless band with a series of peripherally extending columns of outwardly projecting characters, and cutting the wide endless band at laterally spaced intervals between the columns into a plurality of relatively narrower endless bands, the improvement comprising the steps of molding at least one outwardly projecting guide member as an integral part of the wide endless band, molding a plurality of laterally spaced notches within the guide member at a location aligned between corresponding adjacent columns of characters mounting the wide endless band on a rotatable arbor, rotating the arbor and the wide endless band, and aligning the notches within the guide member with a corresponding set of cutters prior to cutting the wide endless band into narrower printing bands.

6. In a method of producing endless flexible printing bands each having peripherally spaced printing characters, and including the steps of molding a wide endless band with a series of peripherally spaced and interally extending rows of outwardly projecting characters, and cutting the wide endless band at laterally spaced intervals into a plurality of relatively narrower endless printing bands, the improvement comprising the steps of molding at least two outwardly projecting and laterally extending peripherally spaced guide members as integral parts of the wide endless band, molding at least one notch within each guide member, mounting the wide endless band on a rotatable cylindrical arbor, rotating the arbor and the wide endless band, and aligning the notch within each guide member with a corresponding cutter prior to cutting the wide endless band into narrower printing bands.

7. In a method of producing endless flexible printing bands each having peripherally spaced printing characters, and including the steps of molding a wide endless band on a substantially flat core blade with a series of peripherally spaced and laterally extending rows of characters projecting outwardly from one side of the core blade, and cutting the wide endless band at laterally spaced intervals into a plurality of relatively narrower endless printing bands, the improvement comprising the steps of molding at least two outwardly projecting and laterally extending parallel spaced guide bars as integral parts of the wide endless band on the one side of the core blade, molding a plurality of notches within each guide bar at laterally spaced intervals, mounting the wide endless band on a rotatable cylindrical arbor, rotating the arbor and the wide endless band, and aligning the notches within each guide bar with a corresponding plurality of spaced cutters prior to cutting the wide endless band into narrower printing bands.

8. In a method of producing endless flexible printing bands each having peripherally spaced printing characters and visually readable characters, and including the steps of molding a wide endless band on a substantially flat core blade with a series of peripherally extending columns of characters projecting outwardly from the band on each side of the core blade, applying a coating of color contrasting material to a portion of the wide endless band on one side of the bore blade for producing the visually readable characters, and cutting the wide endless band at laterally spaced intervals into a plurality of relatively narrower endless printing bands, the improvement comprising the steps of molding at least two laterally extending and peripherally spaced guide bars as integral parts of the wide endless band on each side of the bore blade, locating the guide bars on one side of the core blade with the visually readable characters disposed between the guide bars and with the outer surfaces of the guide bars being flush with the outer surfaces of the characters, removing the coating of color contrasting material from the outer surfaces of the characters by moving a member along the outer surfaces of the guide bars while the wide endless band remains on a blade, molding at least one notch within each guide bar on the other side of the core blade at a location between adjacent columns of characters mounting the wide endless band on a rotatable cylindrical arbor, rotating the arbor and the wide endless band, and aligning the notch within each guide bar with the corresponding cutter prior to cutting the wide endless band into narrower printing bands.

* * * * *

UNITED STATES PATENT AND TRADEMARK OFFICE

CERTIFICATE OF CORRECTION

PATENT NO. : 4,263,242

DATED : April 21, 1981

INVENTOR(S) : William A. Jenkins

It is certified that error appears in the above-identified patent and that said Letters Patent are hereby corrected as shown below:

Column 1, line 40, after "characters", insert -- . -- .

Column 1, line 43, after "cutting", insert -- the -- .

Column 2, line 26, after "claims.", cancel -- dr -- .

Column 6, claim 6, line 4, cancel "interally", and insert -- laterally -- .

Column 6, claim 8, line 45, cancel "bore" and insert -- core -- .

Column 6, claim 8, line 52, cancel "bore", and insert -- core -- .

Signed and Sealed this

*Twenty-eighth* Day of *July 1981*

[SEAL]

*Attest:*

GERALD J. MOSSINGHOFF

*Attesting Officer* *Commissioner of Patents and Trademarks*